(12) United States Patent
Gao et al.

(10) Patent No.: US 8,718,651 B2
(45) Date of Patent: May 6, 2014

(54) METHOD, APPARATUS AND SYSTEM FOR INFORMING A SERVING CELL HANDOVER

(75) Inventors: Yongqiang Gao, Beijing (CN); Xiaoxiao Zheng, Shanghai (CN); Yan Meng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 421 days.

(21) Appl. No.: 13/127,651

(22) PCT Filed: Dec. 1, 2009

(86) PCT No.: PCT/CN2009/075240
§ 371 (c)(1),
(2), (4) Date: May 19, 2011

(87) PCT Pub. No.: WO2010/051782
PCT Pub. Date: May 14, 2010

(65) Prior Publication Data
US 2011/0223917 A1   Sep. 15, 2011

(30) Foreign Application Priority Data

Nov. 4, 2008   (CN) .......................... 2008 1 0175814

(51) Int. Cl.
*H04W 36/00* (2009.01)
*H04W 36/30* (2009.01)
*H04W 36/12* (2009.01)
*H04W 36/14* (2009.01)

(52) U.S. Cl.
CPC .............. *H04W 36/30* (2013.01); *H04W 36/12* (2013.01); *H04W 36/14* (2013.01)
USPC ............................ 455/439; 455/436; 455/438

(58) Field of Classification Search
CPC ..... H04W 36/00; H04W 36/02; H04W 36/04; H04W 36/08; H04W 36/10; H04W 36/12; H04W 36/06; H04W 36/14; H04W 36/16; H04W 36/18; H04W 36/20; H04W 36/22; H04W 36/24; H04W 36/26; H04W 36/28; H04W 36/30; H04W 36/32; H04W 36/34

USPC ...................... 455/422.1, 436–444; 370/328, 370/331–332, 329
See application file for complete search history.

(56) References Cited

U.S. PATENT DOCUMENTS

| 7,711,367 B2 | 5/2010 | Cheng et al. | |
| 2006/0069916 A1* | 3/2006 | Jenisch et al. | 713/172 |

(Continued)

FOREIGN PATENT DOCUMENTS

| CN | 1770918 A | 5/2006 |
| CN | 1798418 A | 7/2006 |

(Continued)

OTHER PUBLICATIONS

3$^{rd}$ Generation Partnership Project, "Technical Specification Group Radio Access Network; UTRAN Iub Interface Node B Application Part (NBAP) Signalling" (Release 8) 3GPP TS 25.433. V8.2.0, Sep. 2008.

(Continued)

*Primary Examiner* — Ajit Patel
(74) *Attorney, Agent, or Firm* — Brinks Gilson & Lione

(57) ABSTRACT

The present disclosure provides a method, an apparatus and a system for informing a serving cell handover, which relate to radio communication technology, and can greatly reduce delay of the handover of the HS-DSCH serving cell, decrease the drop call rate, and enhance user's experience. The method for informing a serving cell handover includes: a radio network controller (RNC) sets up a radio link with a candidate cell, and sets configuration for the candidate cell during the process of setting up the radio link; the RNC sends configuration information of the candidate cell to user equipment (UE); and after acquiring an optimum cell, the RNC informs, through an Iub interface signaling message, a target base station of sending a serving cell handover instruction to the UE. The serving cell handover instruction instructs the UE to hand over to the optimum cell according to the configuration information. The present disclosure is suitable for occasions where the serving cell hands over in the radio network.

19 Claims, 5 Drawing Sheets

(56) References Cited

U.S. PATENT DOCUMENTS

| | | | | |
|---|---|---|---|---|
| 2006/0128312 A1* | 6/2006 | Declerck et al. | ............ | 455/67.11 |
| 2009/0086756 A1* | 4/2009 | Tseng | ........................... | 370/469 |
| 2012/0108248 A1* | 5/2012 | Schreiber | ..................... | 455/446 |

FOREIGN PATENT DOCUMENTS

| | | |
|---|---|---|
| CN | 1819694 A | 8/2006 |
| CN | 101111060 A | 1/2008 |
| CN | 101248698 A | 8/2008 |
| CN | 101742583 B | 8/2012 |
| WO | WO 2006134480 A2 | 12/2006 |
| WO | WO 2008095376 A1 | 8/2008 |

OTHER PUBLICATIONS $3^{rd}$ Generation Partnership Project, "Technical Specification Group Radio Access Network; UTRAN Lub Interface RNSAP Signalling" (Release 8) 3GPP TS 25.423. V8.2.0, Sep. 2008.

Written Opinion of the International Searching Authority issued in corresponding PCT Patent Application No. PCT/CN2009/075240, mailed Mar. 11, 2010.

International Search Report issued in corresponding PCT Patent Application No. PCT/CN2009/075240, mailed Mar. 11, 2010.

Office Action issued in corresponding Chinese Patent Application No. 200810175814.3, mailed Aug. 31, 2011.

Ericsson, "HS-PDSCH Serving Cell Change Enhancements" 6.4.08. 3GPP TSG RAN WG2 #62, Kansas City, USA. May 5-9, 2008. R2-082455.

$3^{rd}$ Generation Partnership Project, "Radio Resource Control (RRC); Protocol specification" 3GPP TS 25.331, V8.4,0, Sep. 2008.

Office Action issued in corresponding Australian Patent Application No. 2009311082, mailed Jun. 14, 2012.

Extended European Search Report issued in corresponding European Patent Application No. 09824437.9, mailed Jul. 27, 2012.

Ericsson, "HS-PDSCH Serving Cell Change Enhancements" Agenda Item 9, 3GPP TSG RAN WG1 Meeting #53. Kansas City, MO, May 5-9, 2008. R1-081883.

Qualcomm Europe, "Improving Reliability of HS-PDSCH Serving Cell Change Procedure" Agenda Item 6,4.6, 3GPP TSG-RAN WG2 #61. Sorrento, Italy, Feb. 11-15, 2008. R2-081015.

Qualcomm Europe, "Analysis of Voice Interruption Delay and Comparison of HS-DSCH Serving Cell Change Procedures" Agenda Item 6.4.8, 3GPP TSG-RAN WG2 #61 bis. Shenzhen, China, Mar. 31-Apr. 4, 2008. R2-081965.

Samsung, "HS-DSCH Serving Cell Change Enhancements" Agenda Item 6.4.8, 3GPP TSG RAN WG2#62. Kansas City, USA, May 5-9, 2008. R2-082445.

Huawei, "RAN3 Procedure of HS-DSCH Serving Cell Change Enhancements" Agenda Item 17, 3GPP TSG-RAN WG3 #62. Prague, CZ, Nov. 10-14, 2008.

Office Action issued in corresponding Chinese Patent Application No. 200810175814.3, mailed Mar. 14, 2012.

* cited by examiner

METHOD, APPARATUS AND SYSTEM FOR INFORMING A SERVING CELL HANDOVER

CROSS-REFERENCE TO RELATED APPLICATIONS

This application is a National Stage of International Application No. PCT/CN2009/075240, filed on Dec. 1, 2009, which claims priority to Chinese Patent Application No. 200810175814.3, filed on Nov. 4, 2008, both of which are hereby incorporated by reference in their entireties.

FIELD OF THE DISCLOSURE

The present disclosure relates to radio communication technology, and particularly, to a method, an apparatus and a system for informing a serving cell handover.

BACKGROUND

In the Wideband Code Division Multiple Access (Wideband CDMA, and WCDMA for short) system, with respect to the characteristics of the high speed packet data such as asymmetry, high peak rate and short activation time, in order to efficiently utilize radio spectrum resources and increase the downlink peak rate and cell throughput, the 3rd Generation Partnership Project (3GPP) standardization organization introduces a downlink enhancement technology, i.e., the High Speed Downlink Packet Access (HSDPA) technology, under the version of Release 5.

The HSDPA technology introduces a new transmission channel, i.e., the High-Speed Downlink Shared Channel (HS-DSCH), to support enhanced access bearer services of interaction type, backstage type, and streaming media type. Meanwhile, in order to complete control, dispatching and feedback of corresponding HS-DSCH, the HSDPA technology introduces at the physical layer, a Shared Control Channel for HS-DSCH (HS-SCCH) and a High Speed Dedicated Physical Control Channel (HS-DPCCH) including uplink and downlink physical control channels, so as to directly and quickly complete the signaling interaction between User Equipment (UE) and a base station (Node B).

The HSDPA technology introduces a MAC-hs/ehs entity at the Media Access Control (MAC) of the UE and the Node B to complete related functions such as dispatching, feedback, and retransmission. With the performance of Fast Hybrid Automatic Repeat request (Fast Hybrid ARQ) and the direct control by the Node B, the retransmission speed is increased, and the data transmission delay is reduced.

However, under many occasions, for example, in the downtown area or the valley area, and when the UE moves at a high speed, the signal strength of the source cell fades fast; at the preparation stage of serving cell handover, especially when the radio link is reconfigured, the prior art repeats corresponding configurations of HSDPA parameters, and there is a long delay for transmitting the reconfiguration signaling and waiting for the corresponding response message, thus extra delay is brought for the serving cell handover; as a result, the handover message of the serving cell cannot be transmitted from the source cell to the UE, and the serving cell handover cannot be carried out, which causes a high drop call rate; in addition, as the time for HS-DSCH serving cell handover is too long, the service is suspended for a long time, which degrades the user's experience in real-time services such as Voice over Internet Protocol (VoIP) or Circuit Switched over High-Speed Packet Access (CS over HSPA).

SUMMARY

One aspect of the present disclosure provides a method for informing a serving cell handover. The method includes the following: a Radio Network Controller (RNC) sets up a radio link with a candidate cell, and sets configuration for the candidate cell during the process of setting up the radio link; the RNC sends configuration information of the candidate cell to User Equipment (UE); and after acquiring an optimum cell, the RNC informs, through an Iub interface signaling message, a target base station of sending a serving cell handover instruction to the UE, the serving cell handover instruction instructs the UE to hand over to the optimum cell according to the configuration information.

Another aspect of the present disclosure provides an apparatus for informing a serving cell handover, including: a radio link setup and configuration unit configured to set up a radio link with a candidate cell, and set configuration for the candidate cell during the process of setting up the radio link; a sending unit configured to send configuration information of the candidate cell to an UE; and an informing unit configured to, after acquiring an optimum cell, inform, through an Iub interface signaling message, a target base station of sending a serving cell handover instruction to the UE. The serving cell handover instruction instructs the UE to hand over to the optimum cell according to the configuration information sent by the sending unit.

Another aspect of the present disclosure provides a communication system, including an RNC, the RNC is configured to set up a radio link with a candidate cell, and set configuration for the candidate cell during the process of setting up the radio link; send configuration information of the candidate cell to an UE; and after acquiring an optimum cell, inform, through an Iub interface signaling message, a target base station of sending a serving cell handover instruction to the UE. The serving cell handover instruction instructs the UE to hand over to the optimum cell according to the configuration information.

During a serving cell handover, a radio network controller informs a target base station, by sending an Iub interface signaling message to the target base station, of instructing the UE to carry out a serving cell handover. In this way, delay and repeated configuration of the serving cell are avoided, where the delay and repeated configuration are caused by using a radio link reconfiguration message to inform the target base station of instructing the UE to carry out a serving cell handover. Therefore, delay of the handover of the HS-DSCH serving cell is greatly reduced, the drop call rate is decreased, and the user's experience is enhanced.

DETAILED DESCRIPTION OF THE EMBODIMENTS

Figure 1:
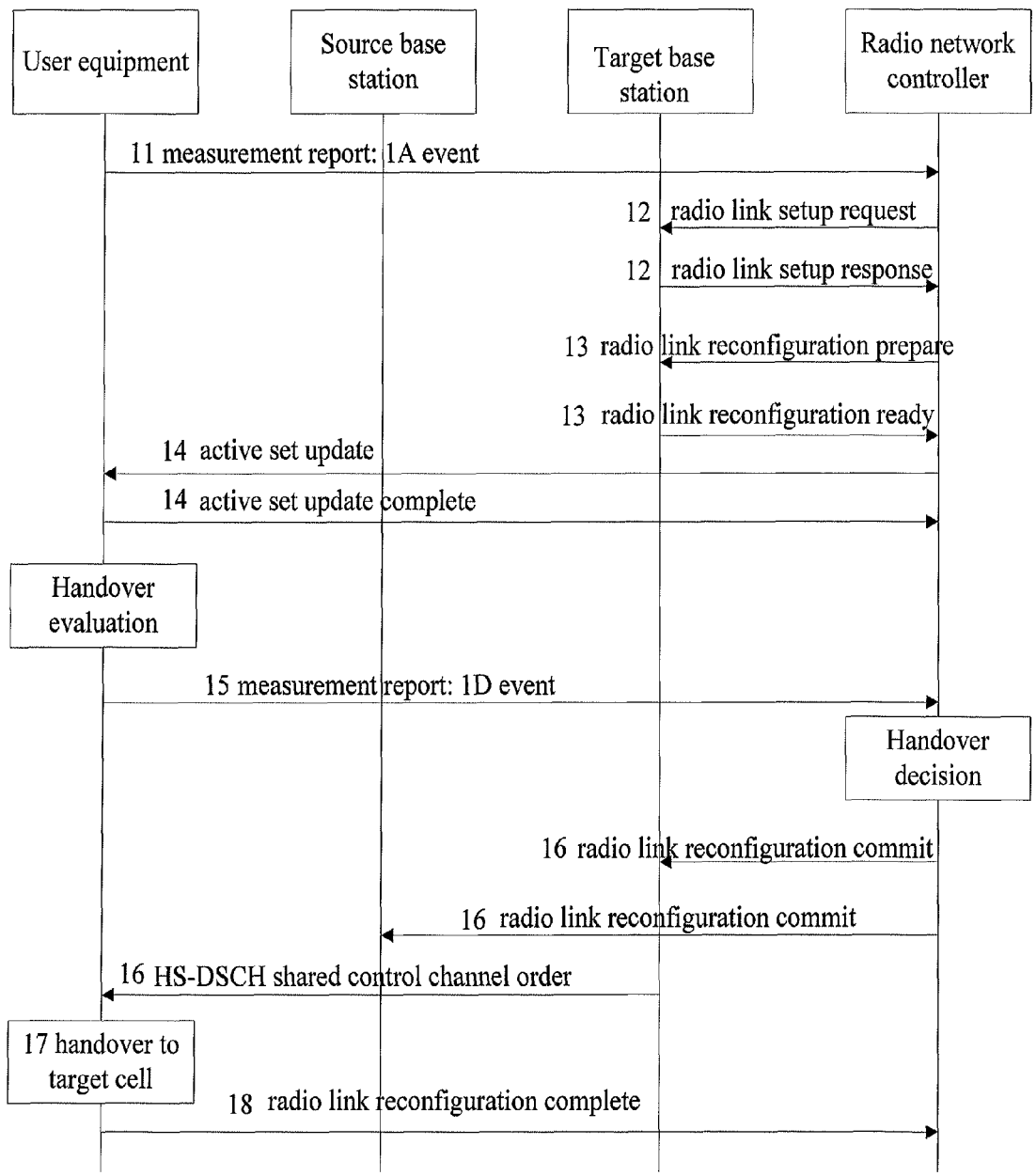
FIG. 1 is a schematic diagram of a handover process of an HS-DSCH serving cell according to an embodiment of the present disclosure.

In order to describe the embodiments of the present disclosure more clearly, the embodiments of the present disclosure are described in detail as follows with reference to the drawings. The following descriptions are only some embodiments of the present disclosure, and a person skilled in the art can obtain other embodiments of the present disclosure based on those embodiments, without paying any creative effort.

The following embodiments of the present disclosure mainly deal with the occasions where the source cell and the target cell each access the network through different base stations, and they are also suitable for the occasions where the source cell and the target cell access the network through the same base station.

In order to make the present disclosure clearer, the embodiments of the present disclosure are described by taking the handover of HS-DSCH serving cell as an example. A shown in FIG. 1, the description includes the follows.

11: An RNC receives a 1A event reported by a UE and acquires a candidate cell.

For example, the UE sends the RNC a same frequency measurement report, and trigger event of the measurement report may be a 1A event or 1E event, wherein the 1A event and the 1E event are trigger events for the UE to instruct the network to add a new cell to an active set (a set of the cells currently used by the UE), and the new cell is a cell having a good signal quality among the neighboring cells of the current serving cell of the UE. The main distinction between the 1A event and the 1E event is that the trigger threshold of the 1A event is relative, and the trigger threshold of the 1E event is absolute. The 1A event and the 1E event can be used individually or in combination.

An example is described as above by taking the 1A event as trigger event of the measurement report, and related description is suitable to the condition of the 1E event.

12: The RNC sets up a radio link with the candidate cell.

In the implementation process, the RNC sets up a radio link with a base station to which the candidate cell belongs, and such base station is hereinafter referred to as the candidate cell for the convenience of description.

For example, the RNC can establish a link with the candidate cell by sending, via a target Node B, to the candidate cell a radio link addition request message (for example, Radio Link Addition Request) or a radio link setup request message (for example, Radio Link Setup Request) that supports the Node B Application Protocol (NBAP) of the Radio Network Layer Control Protocol (RNLCP), wherein the radio link addition request message or the radio link setup request message includes related data for radio link configuration, for example, HSDPA related information, where the information is such as HS-DSCH information, HS-DSCH Radio Network Temporary Identity (RNTI), and High Speed Physical Downlink Shared Channel (HS-PDSCH) radio link number.

The candidate cell receives the radio link addition request message or the radio link setup request message, completes corresponding radio link configuration, and sends, via the target Node B, the RNC a radio link addition response message (for example, Radio Link Addition Response) or a radio link setup response message (for example, Radio Link Setup Response).

13: The RNC carries out a radio link reconfiguration for the candidate cell.

An example is described as follows, in which the radio link reconfiguration is carried out under a synchronous mode.

The RNC sends, via the target Node B, the candidate cell a radio link reconfiguration prepare message (for example, Radio Link Reconfiguration Prepare) including information related to addition, modification and deletion of HS-DSCH, and the information is used by the target Node B for addition, modification and deletion of related HS-DSCH on the radio link.

The HSDPA related content in the radio link reconfiguration prepare message is substantially similar to the content in the radio link addition request message or the radio link setup request message.

The candidate cell carries out corresponding modification according to the radio link reconfiguration prepare message, and after reserving required resources for the new configuration of the radio link, sends, via the target Node B, the RNC a radio link reconfiguration ready message (for example, Radio Link Reconfiguration Ready).

To be noted, as the configuration process of the radio link in the establishment process of the radio connection is completed, the radio link is reconfigured in step 13.

14: The RNC sends configuration information to the UE.

For example, the RNC sends configuration information to the UE through an active set update message (for example, Active Set Update), to inform the UE that a new radio link has been existed. The configuration information includes HS-DSCH related configuration information and corresponding Enhanced Dedicated Channel (E-DCH) configuration information.

The UE adds the new radio link to the radio link set, and sends the RNC an active set update complete message (for example, Active Set Update Complete), to indicate that an update of adding a new radio link to the active set is completed.

15: After receiving a 1D event reported by the UE, the RNC performs a handover decision.

16: After performing the handover decision, the RNC sends the target Node B a radio link reconfiguration commit message (for example, Radio Link Reconfiguration Commit), to inform the target Node B of carrying out a handover of the HS-DSCH serving cell.

The RNC sends the source Node B a radio link reconfiguration commit message, to inform the source Node B of carrying out a handover of the HS-DSCH serving cell. In addition, the serving RNC (SRNC) sends a drift RNC (DRNC) a radio link reconfiguration commit message, to inform the DRNC of carrying out a handover of the HS-DSCH serving cell.

The target Node B sends the UE an HS-DSCH Shared Control Channel order (HS-SCCH order) to inform the UE of carrying out a handover of the HS-DSCH serving cell.

17: The UE carries out a handover of the HS-DSCH serving cell.

For example, under an asynchronous mode, after receiving the HS-SCCH order for 40 ms, the UE hands over to the target cell to receive HS-DSCH channel data.

For example, under a synchronous mode, after receiving the HS-SCCH order, the UE hands over to the target cell within designated activation time to receive related HS-DSCH channel data.

18: After carrying out the handover of the HS-DSCH serving cell, the UE sends the RNC a radio link reconfiguration complete message (for example, Radio Link Reconfiguration Complete), and the handover of the HS-DSCH serving cell is completed.

Figure 2:
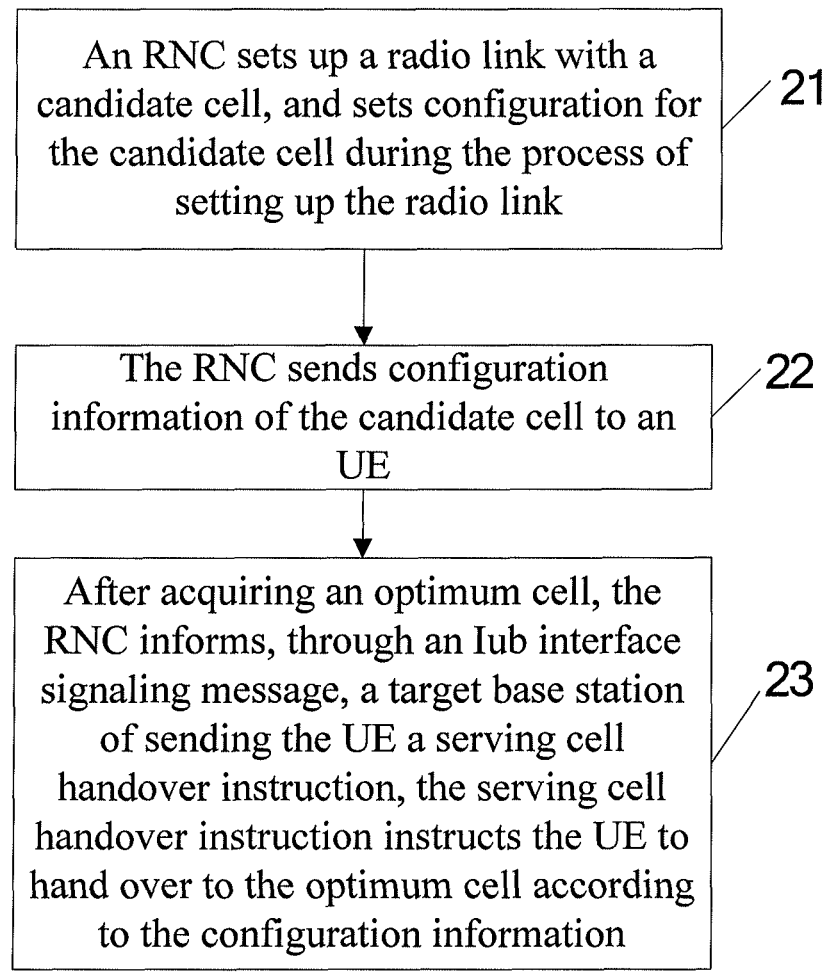
FIG. 2 is a flowchart of a method for informing a serving cell handover according to an embodiment of the present disclosure.

FIG. 2 shows a method for informing a serving cell handover according to an embodiment of the present disclosure, including:

21: An RNC sets up a radio link with a candidate cell, and sets configuration for the candidate cell during the process of setting up the radio link;

22: The RNC sends configuration information of the candidate cell to an UE;

23: After acquiring an optimum cell, the RNC informs, through an Iub interface signaling message, a target base station of sending a serving cell handover instruction to the UE. The serving cell handover instruction instructs the UE to hand over to the optimum cell according to the configuration information.

As can be seen from the above, the embodiment no longer use the reconfiguration message to reconfigure the candidate cell which has been configured during the process of setting up the radio link, and no longer use the reconfiguration message to inform the target base station of instructing the UE to carry out a serving cell handover.

In the present embodiment, during the serving cell handover, the RNC informs, by sending an Iub interface signaling message to the target base station, the target base station of instructing the UE to carry out a serving cell handover. In this way, delay and repeated configuration of the serving cell are avoided, where the delay and repeated configuration are caused by using a radio link reconfiguration message to inform the target base station of instructing the UE to carry out a serving cell handover. Therefore, delay of the handover of the HS-DSCH serving cell is greatly reduced, the drop call rate is decreased, and the user's experience is enhanced.

Figure 3:
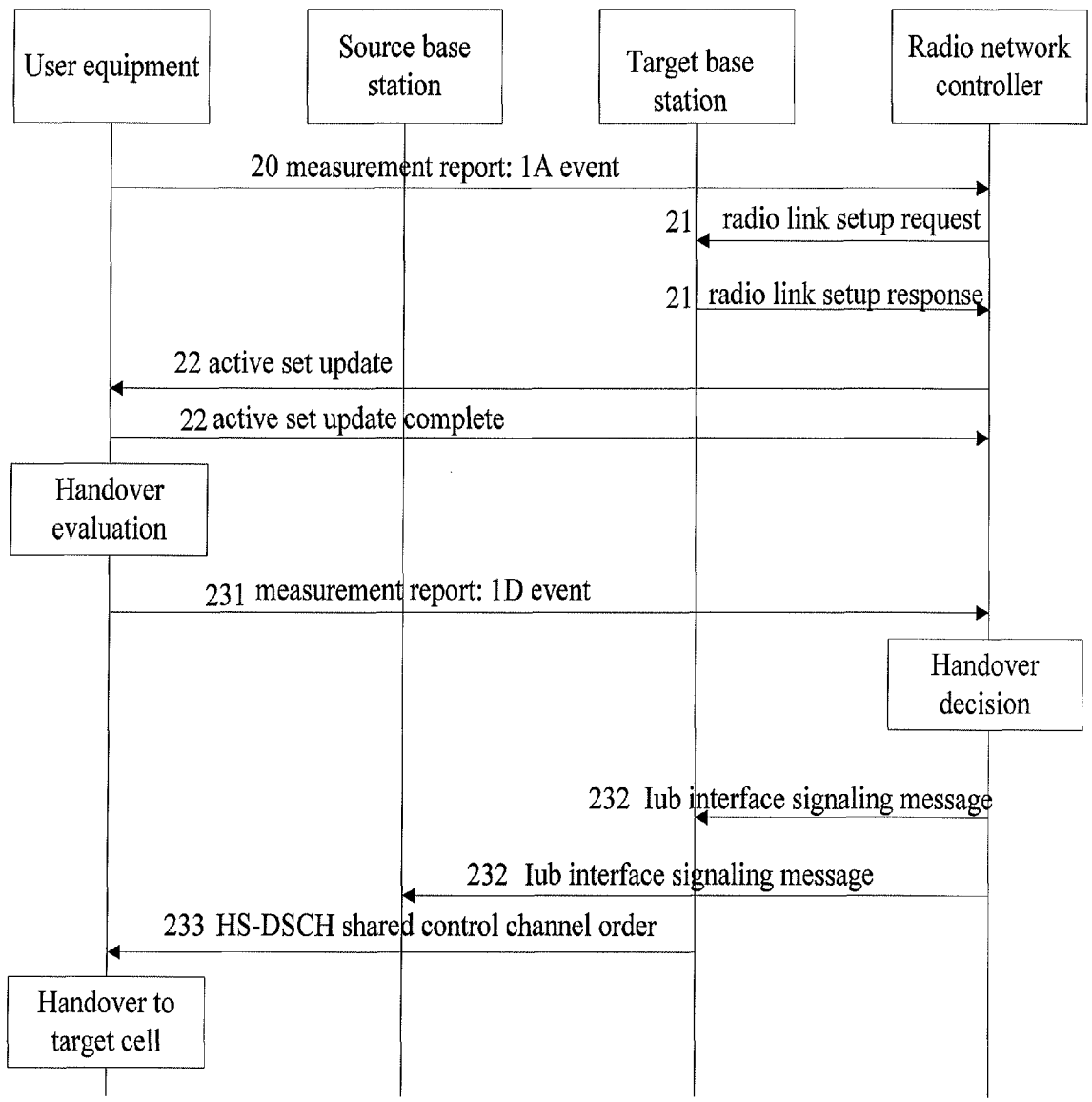
FIG. 3 is a schematic diagram of a method for informing a serving cell handover according to another embodiment of the present disclosure.

FIG. 3 shows a method for informing a serving cell handover according to another embodiment of the present disclosure, including:

21: An RNC sets up a radio link with a candidate cell, and sets configuration for the candidate cell;

For example, during the process of setting up the radio link with the candidate cell, the RNC sets configuration for the candidate cell.

Before step 21, the method further includes step 20, as shown in FIG. 3.

20: The UE sends the RNC a same frequency measurement report, and the trigger event of the measurement report is, but not limited by, a 1A event, and also may be a 1E event, so as to instruct the network to add a new cell to an active set, and the cell corresponding to the 1A event is the candidate cell.

For example, step 21 can be implemented in the following mode.

Mode 1: The RNC sends the candidate cell a radio link setup request message (for example, Radio Link Setup Request) requesting to establish a radio link with the candidate cell, and the candidate cell sends the RNC a radio link setup response message (for example, Radio Link Setup Response) after accepting the radio connection.

Mode 2: The RNC sends the candidate cell a radio link addition request message (for example, Radio Link Addition Request) requesting to establish a radio connection with the candidate cell, and the candidate cell sends the RNC a radio link addition response message (for example, Radio Link Addition Response) after accepting the radio connection.

Through the setup of the radio link, resource configuration of the candidate cell can be implemented. The detailed method for the resource configuration and the detailed contents of the above messages can be acquired by a person skilled in the art from the disclosure, and herein is not described in detail.

22: The RNC sends configuration information to the UE; for example, the RNC sends the configuration information to the UE through an active set update message (for example, Active Set Update), where the active set update message carries the configuration information including HS-DSCH related configuration information and corresponding E-DCH configuration information; the UE adds a new radio link to the radio link set, and sends the RNC an active set update complete message (for example, Active Set Update Complete), to indicate that an update of the active set is completed.

After acquiring an optimum cell, the RNC informs a target Node B, by sending an Iub interface signaling message to the target Node B, of sending a serving cell handover instruction to the UE. The serving cell handover instruction instructs the UE to hand over to the optimum cell according to the configuration information, including:

231: The RNC receives a 1D event reported by the UE, and takes a cell corresponding to the 1D event as the optimum cell.

232: After making a handover decision, the RNC sends the target Node B the Iub interface signaling message; at the same time, the RNC transmits the Iub interface signaling message to a source Node B to inform the source Node B of carrying out a handover of the HS-DSCH serving cell.

233: According to the received Iub interface signaling message, the target Node B sends an HS-SCCH order to the UE, so as to inform the UE of carrying out a handover of the HS-DSCH serving cell according to the configuration information.

The Iub interface signaling message may be implemented in multiple ways. For example, the Iub interface signaling message may be an HS-DSCH serving cell handover command. The HS-DSCH serving cell handover command carries synchronous or asynchronous mode indication information, HS-SCCH channelized code, active time Connection Frame Number (CFN) (only corresponding to synchronous mode), MAC-ehs reset instruction and the number of repeated times of HS-SCCH order.

In the embodiment of the present disclosure, the handover of the serving cell does not need step 13 in which the RNC carries out a radio link reconfiguration of the candidate cell, and no longer informs the target Node B, through the radio link reconfiguration commit message, of instructing the UE to carry out a serving cell handover, instead, an Iub interface signaling message is used to inform the target Node B of instructing the UE to carry out a serving cell handover.

Further, the method also includes: The RNC (used for implementing the function of SRNC) sends an Iur interface signaling message to corresponding DRNC, so as to inform the DRNC of carrying out an HS-DSCH serving cell handover.

The UE carries out a handover of the HS-DSCH serving cell according to the HS-SCCH order from the target Node B, see step 17 for the detailed process.

It can be seen that in the embodiments of the present disclosure, after the RNC sets up a radio link with the candidate cell, the radio link reconfiguration message is no longer used to pre-configure the candidate cell, in consideration that the candidate cell has been configured in the process for setting up the radio link; accordingly, after deciding to carry out a handover, the RNC no longer uses the radio link reconfiguration commit message to inform the target Node B of instructing the UE to carry out a serving cell handover, instead, it uses the Iub interface signaling message to inform the target Node B of instructing the UE to carry out a serving cell handover. In this way, delay and repeated configuration of the serving cell are avoided, where the delay and repeated configuration are caused by using the radio link reconfiguration message to inform the target Node B of instructing the UE to carry out a serving cell handover. Therefore, delay of the handover of the HS-DSCH serving cell is greatly reduced, the drop call rate is decreased, and the user's experience is enhanced.

Figure 4:
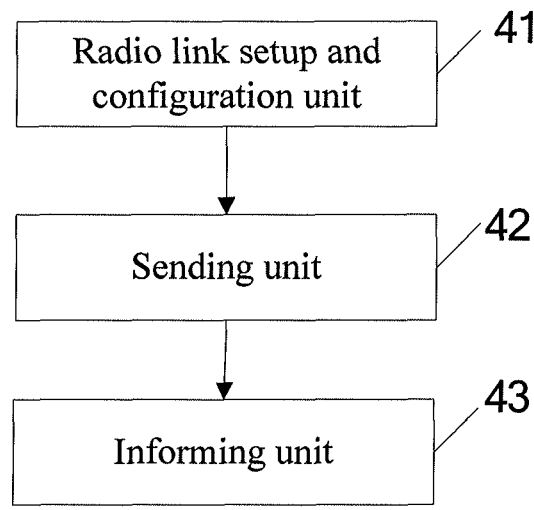
FIG. 4 is structural diagram 1 of an apparatus for informing a serving cell handover according to an embodiment of the present disclosure.

The embodiments of the present disclosure further provide an apparatus for informing a serving cell handover as shown in FIG. 4, including: a radio link setup and configuration unit 41, a sending unit 42 and an informing unit 43.

The radio link setup and configuration unit 41 is configured to set up a radio link with a candidate cell, and configure the candidate cell during the process of setting up the radio link; the sending unit 42 is configured to send configuration information to the UE; the informing unit 43 is configured to send the target Node B an Iub interface signaling message, after acquiring an optimum cell, to inform the target Node B of sending a serving cell handover instruction to the UE, so as to instruct the UE to hand over to the optimum cell according to the configuration information sent by the sending unit 42.

The Iub interface signaling message carries synchronous or asynchronous mode indication information, HS-SCCH channelized code, active time Connection Frame Number (CFN) (only corresponding to synchronous mode), MAC-ehs reset instruction and repeated times of HS-SCCH order.

Figure 5:
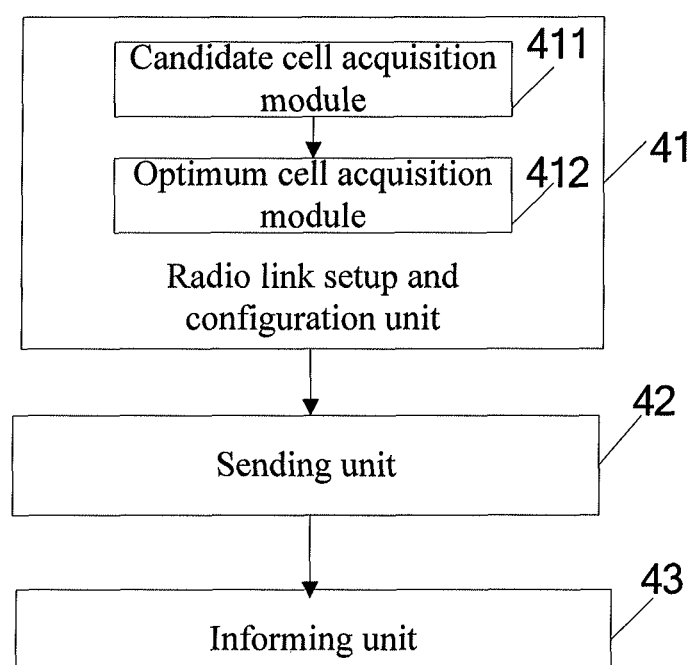
FIG. 5 is structural diagram 2 of an apparatus for informing a serving cell handover according to an embodiment of the present disclosure.

Further, as shown in FIG. 5, the radio link setup and configuration unit 41 includes a candidate cell acquisition module 411 and an optimum cell acquisition module 412. The candidate cell acquisition module 411 is configured to receive the 1A event or the 1E event reported by the UE, and take a cell corresponding to the 1A event or the 1E event as the candidate cell; the optimum cell acquisition module 412 is configured to receive the 1D event reported by the UE, and take a cell corresponding to the 1D event as the optimum cell.

The radio link setup and configuration unit 41 implements a connection of radio link with the candidate cell, and a configuration of the candidate cell.

Further, the informing unit 43 is further configured to send an Iub interface signaling message to the source Node B, so as to inform the source Node B of carrying out a handover of the HS-DSCH serving cell; send an Iur interface signaling message to the corresponding DRNC, so as to inform the DRNC of carrying out a handover of the HS-DSCH serving cell.

In the embodiments of the present disclosure, when a serving cell handover is carried out, the RNC sends an Iub interface signaling message to the target Node B to inform the target Node B of instructing the UE to carry out a serving cell handover. In this way, delay and repeated configuration of the serving cell are avoided, where the delay and repeated configuration are caused by using a radio link reconfiguration message to inform the target Node B of instructing the UE to carry out a serving cell handover. Therefore, delay of the handover of the HS-DSCH serving cell is greatly reduced, the drop call rate is decreased, and the user's experience is enhanced.

Figure 6:
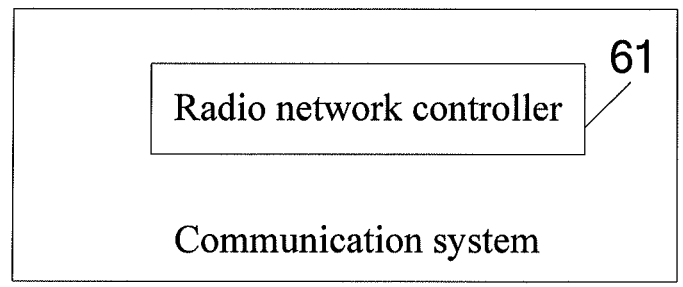
FIG. 6 is a schematic diagram of a communication system according to an embodiment of the present disclosure.

The embodiments of the present disclosure further provide a communication system as shown in FIG. 6, including a radio network controller (RNC) 61.

The RNC 61 is configured to set up a radio link with a candidate cell, and configure the candidate cell during the process of setting up the radio link; send configuration information of the candidate cell to an UE; and after acquiring an optimum cell, inform, through an Iub interface signaling message, a target base station of sending a serving cell handover instruction to the UE. The serving cell handover instruction instructs the UE to hand over to the optimum cell according to the configuration information.

Further, according to the method embodiments as illustrated in FIGS. 1 and 3, the RNC in the communication system of the present embodiment is further configured to, receive a 1A event or 1E event reported by the UE and take a cell corresponding to the 1A event or 1E event as the candidate cell, receive a 1D event reported by the UE, and take a cell corresponding to the 1D event as the optimum cell; send an Iub interface signaling message to a source base station to inform the source base station of carrying out a serving cell handover; and send an Iur interface signaling message to a DRNC to inform the DRNC of carrying out a serving cell handover.

In the communication system provided by the embodiment of the present disclosure, during a serving cell handover, the RNC 61 sends an Iub interface signaling message to a target Node B to inform the target Node B of instructing an UE to carry out a serving cell handover. In this way, delay and repeated configuration of the serving cell are avoided, where the delay and repeated configuration are caused by using the radio link reconfiguration message to inform the target Node B of instructing the UE to carry out a serving cell handover. Therefore, delay of the handover of the HS-DSCH serving cell is greatly reduced, the drop call rate is decreased, and the user's experience is enhanced.

A person skilled in the art clearly appreciates that, the above described system, apparatus, elementary functions and working processes are only exemplary descriptions, so as to describe conveniently and briefly; see corresponding processes in the previous method embodiments for the detailed working processes, and herein are not described in detail.

Through the above descriptions of the embodiments, a person skilled in the art clearly appreciates that the present disclosure is implemented by a combination of software and necessary general hardware platform, and of course just by hardware, but under most conditions, the former is a better implementation way. Based on such understanding, the present disclosure may be implemented in a form of software product, which is stored in a storage medium including several instructions for instructing a computer device including a processor (for example, personal computer, server, and network device) to execute all or part of steps of the methods described in the embodiments of the present disclosure. The storage medium includes: any medium that can store program code, such as U disk, mobile hard disk, ROM, RAM, magnetic disk or optical disk.

In the embodiments provided by the present application, it shall be appreciated that, the disclosed system, apparatus and method can be implemented in other ways, without deviating from the spirit and scope of the present application. For example, the apparatus embodiments described above are only exemplary, and in which the unit division is only a logic function division, and there may be other division ways during the practical implementation, for example, multiple units or assemblies may be combined or integrated into another system, or some features may be omitted or not executed. The units described as separated parts may be or may be not physically separated from each other, the parts shown as units may be or may be not physical units, i.e., they can be located at the same place or distributed to multiple network units. The object of the embodiment can be achieved by selecting all or partial modules upon actual demand, which can be understood and implemented by a person skilled in the art without paying any creative effort.

In addition, the described system, apparatus and method as well as the drawings of different embodiments can be combined or integrated with other system, module, technology or method, without going beyond the scope of the present application. In addition, the shown or discussed mutual coupling, direct coupling, or communication linkage may be implemented via indirect coupling or communication linkage between some interfaces, devices or units, in a form of electrical, mechanical, or others.

The above descriptions are only some embodiments of the present disclosure, and the protection scope of the disclosure is not limited thereby, any change or substitution, which can be easily conceived by a person skilled in the art within the technical scope disclosed by the disclosure, shall be covered by the protection scope of the disclosure. Therefore, the protection scope of the disclosure shall be dependent on the claims.

What is claimed is:

1. A method for informing a serving cell handover, comprising:
    setting up, by a radio network controller (RNC) a radio link with a candidate cell, and setting configuration for the candidate cell during the process of setting up the radio link;
    sending, by the RNC, configuration information of the candidate cell to a user equipment (UE); and
    informing, by the RNC, after acquiring an optimum cell, through an Iub interface signaling message, a target base station of sending a serving cell handover instruction to the UE, wherein the Iub interface signaling message carries the number of repeated times of a Shared Control Channel for High-Speed Downlink Shared Channel (HS-SCCH) order, and wherein the serving cell handover instruction is used to instruct the UE to hand over to the optimum cell according to the configuration information and wherein the Iub interface signaling message comprises mode indication information to indicate one of a synchronous or asynchronous mode.

2. The method according to claim 1, wherein the Iub interface signaling message further comprises: a value of active time Connection Frame Number (CFN), a HS-SCCH channelized code, and a Media Access Control entity, MAC-ehs, reset.

3. The method according to claim 1, wherein the serving cell handover instruction comprises an HS-SCCH order.

4. The method according to claim 1, wherein acquiring the optimum cell by the RNC comprises:
    receiving, by the RNC, a 1D event reported by the UE, and taking a cell corresponding to the 1D event as the optimum cell.

5. The method according to claim 1, before setting up, by the RNC, the radio link with the candidate cell, the method further comprises: acquiring, by the RNC, the candidate cell;
    wherein acquiring, by the RNC, the candidate cell comprises:
    receiving, by the RNC, a 1A event or 1E event reported by the UE and taking a cell corresponding to the 1A event or 1E event as the candidate cell.

6. The method according to claim 1, further comprising:
    sending, by the RNC, the Iub interface signaling message to a source base station to inform the source base station of carrying out a serving cell handover.

7. The method according to claim 1, further comprising: by the RNC, sending an Iur interface signaling message to a corresponding drift RNC, DRNC, to inform the DRNC of carrying out a serving cell handover.

8. An apparatus for informing a serving cell handover, comprising:
    a radio link setup and configuration unit configured to set up a radio link with a candidate cell, and set configuration for the candidate cell during the process of setting up the radio link;
    a sending unit configured to send a configuration information of the candidate cell to a user equipment (UE); and
    an informing unit, configured to, after acquiring an optimum cell, inform, through an Iub interface signaling message, a target base station of sending a serving cell handover instruction to the UE, wherein the Iub interface signaling message carries the number of repeated times of a Shared Control Channel for High-Speed Downlink Shared Channel (HS-SCCH) order, wherein the Iub interface signaling message comprises mode indication information to indicate one of a synchronous or asynchronous mode, and wherein the serving cell handover instruction is used to instruct the UE to hand over to the optimum cell according to the configuration information sent by the sending unit.

9. The apparatus according to claim 8, wherein the radio link setup and configuration unit comprises:
    a candidate cell acquisition module configured to receive a 1A event or 1E event reported by the UE, and take a cell corresponding to the 1A event or 1E event as the candidate cell; and
    an optimum cell acquisition module configured to receive a 1D event reported by the UE, and take a cell corresponding to the 1D event as the optimum cell.

10. The apparatus according to claim 8, wherein the informing unit is further configured to send an Iub interface signaling message to a source base station to inform the source base station of carrying out a serving cell handover; and send an Iur interface signaling message to a corresponding drift radio network controller, DRNC, to inform the DRNC of carrying out a serving cell handover.

11. A communication system, comprising a radio network controller (RNC),
    the RNC is configured to set up a radio link with a candidate cell, and set configuration for the candidate cell during the process of setting up the radio link; send configuration information of the candidate cell to a user equipment (UE); and after acquiring an optimum cell, inform, through an Iub interface signaling message, a target base station of sending a serving cell handover instruction to the UE, wherein the Iub interface signaling message carries the number of repeated times of a Shared Control Channel for High-Speed Downlink Shared Channel (HS-SCCH) order, wherein the Iub interface signaling message comprises mode indication information to indicate one of a synchronous or asynchronous mode, and wherein the serving cell handover instruction instructs the UE to hand over to the optimum cell according to the configuration information.

12. The communication system according to claim 11, wherein the RNC is further configured to receive a 1A event or 1E event reported by the UE and take a cell corresponding to the 1A event or 1E event as the candidate cell, and receive a 1D event reported by the UE and take a cell corresponding to the 1D event as the optimum cell.

13. The communication system according to claim 11, wherein the RNC is further configured to send the Iub interface signaling message to a source base station to inform the source base station of carrying out a serving cell handover; and send an Iur interface signaling message to a drift RNC (DRNC) to inform the DRNC of carrying out a serving cell handover.

14. The communication system according to claim 11, further comprising the target base station configured to receive the Iub interface signaling message sent by the RNC, and send the UE the serving cell handover instruction.

15. The method according to claim 1, wherein the Iub interface signaling message further comprises a HS-SCCH channelized code, and a MAC-ehs reset instruction.

16. The apparatus according to claim 8, wherein the Iub interface signaling message further comprises: a value of active time Connection Frame Number (CFN), a HS-SCCH channelized code, and a Media Access Control entity, MAC-ehs, reset instruction.

17. The apparatus according to claim 8, wherein the Iub interface signaling message further comprises a HS-SCCH channelized code, and a MAC-ehs reset instruction.

18. The communication system according to claim 11, wherein the Iub interface signaling message further comprises: a value of active time Connection Frame Number (CFN), a HS-SCCH channelized code, and a Media Access Control entity, MAC-ehs, reset instruction.

19. The communication system according to claim 11, wherein the Iub interface signaling message further comprises a HS-SCCH channelized code, and a MAC-ehs reset instruction.

* * * * *

UNITED STATES PATENT AND TRADEMARK OFFICE
CERTIFICATE OF CORRECTION

PATENT NO.       : 8,718,651 B2
APPLICATION NO. : 13/127651
DATED            : May 6, 2014
INVENTOR(S)      : Gao et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 436 days.

Signed and Sealed this
Twenty-ninth Day of September, 2015

Michelle K. Lee
*Director of the United States Patent and Trademark Office*